Sept. 5, 1967        E. L. ANDERSON        3,340,034

METHOD OF AND MOLD FOR FORMING HOLLOW ARTICLES

Filed Dec. 11, 1964        3 Sheets-Sheet 1

INVENTOR.
Elmer L. Anderson
BY Charles W. Gregg

AGENT

INVENTOR.
Elmer L. Anderson
BY Charles W. Gregg

AGENT

Sept. 5, 1967  E. L. ANDERSON  3,340,034
METHOD OF AND MOLD FOR FORMING HOLLOW ARTICLES
Filed Dec. 11, 1964  3 Sheets-Sheet 3
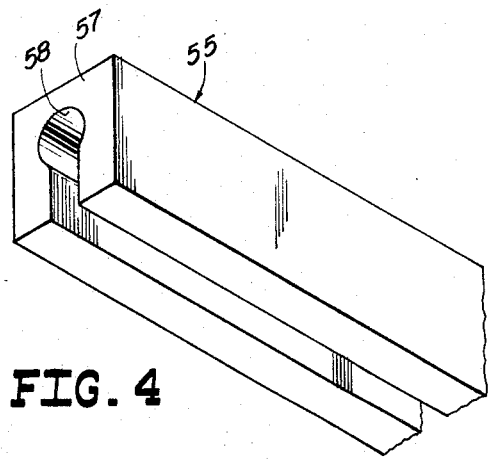
FIG. 4
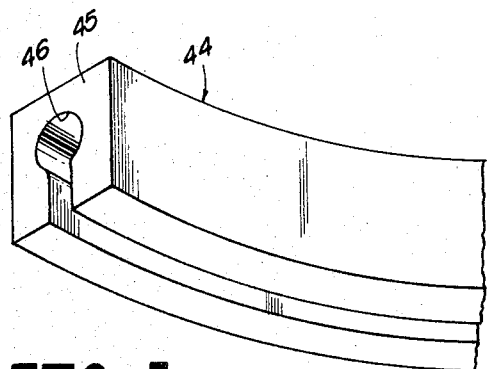
FIG. 3
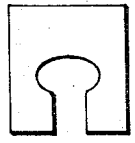   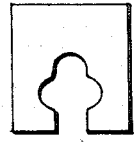   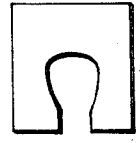
FIG.5  FIG.6  FIG.7
INVENTOR.
Elmer L. Anderson
BY Charles W. Gregg
AGENT

United States Patent Office 3,340,034
Patented Sept. 5, 1967

3,340,034
METHOD OF AND MOLD FOR FORMING HOLLOW ARTICLES
Elmer L. Anderson, Corning, N.Y., assignor to Corning Glass Works, Corning, N.Y., a corporation of New York
Filed Dec. 11, 1964, Ser. No. 417,590
11 Claims. (Cl. 65—109)

This invention relates to the forming of hollow articles of a thermoplastic material. More particularly the present invention relates to a method of reshaping lengths of thermoplastic tubing, such as glass tubing, to provide bulbar or bulb-shaped containers or envelopes, such enclosures being useful, for example, for the bulb portions of electric or incandescent lamps. Still more specifically the invention relates to a novel method of reforming pieces of thermoplastic tubing, having one closed or sealed end, to form hollow bulbar vessels or enclosures having a radially symmetric configuration, and to a mold to be used in conjunction with the practice of such novel method.

The forming of bulbs for electric lamps by enclosing lengths of heated tubing in a blow-mold comprising comating hinged mold halves which when closed provide a mold cavity of greater diameter than the tubing, and then rotating the tubing and directing air pressure into the same to cause it to expand and fill the mold cavity, is relatively old and well known in the art, being shown, for example, in Letters Patent of the United States 2,159,736, issued May 23, 1939, to Walter J. Geiger and Alfred T. Gaskill, and entitled, "Electric Lamp and Method of Making the Same." While the method disclosed in such patent is satisfactory for forming some types of lamp bulbs, for obvious economic reasons and competitive purposes the economical production of lamp bulbs at as high a rate of speed as possible is desirable. Accordingly, it is an object of the present invention to provide a method of forming lengths of thermoplastic tubing, such as glass tubing, into hollow vessels or containers suitable for use, for example, as lamp bulbs, the practice of such method being capable of forming such containers at a higher rate of speed and more economically than is practicable by the use of the heretofore known methods of forming such containers.

It is another object of the invention to provide a new and novel method of blow-mold forming hollow bulbar envelopes of a thermoplastic material.

It is a third object of the invention to provide a new and novel type of mold for use in forming bulb-shaped containers of a thermoplastic material by the so-called "blowing" technique.

In accomplishing the above objects of the invention, a continuous type of mold, comprising a mold body having a bulbar mold cavity extending completely through the mold body, is employed, and a plurality of lengths of heated thermoplastic tubing are sequentially and continuously fed into said cavity and rotatively moved therethrough while pressurized aeriform fluid is directed into the interior of the lengths of tubing to aid in expanding them to conform or correspond to the configuration of the mold cavity.

Other objects and characteristic features of the invention will become apparent as the description proceeds.

Although the method of the present invention is discussed as having utility in forming incandescent or electric lamp bulbs, it is to be understood that the invention is not intended to be confined to such use but may be employed for the forming of bulbar hollow vessels, containers, envelopes or enclosures from a thermoplastic material and to be used for any suitable purpose.

The invention will best be understood with reference to the accompanying drawings, in which:

FIG. 3 is an isometric bottom view of a portion of the glass forming mold employed in the apparatus illustrated in FIGS. 1 and 2;

FIG. 4 is an isometric bottom view of a portion of a glass forming mold similar to that of FIG. 3 and which may be used in conjunction with an alternative form of apparatus suitable for practicing the invention;

FIGS. 5, 6 and 7 are schematic drawings illustrating alternative cross-sectional configurations for the mold cavities of the molds illustrated in FIGS. 3 and 4.

Similar reference characters refer to similar parts in each of the drawings.

Figure 1:
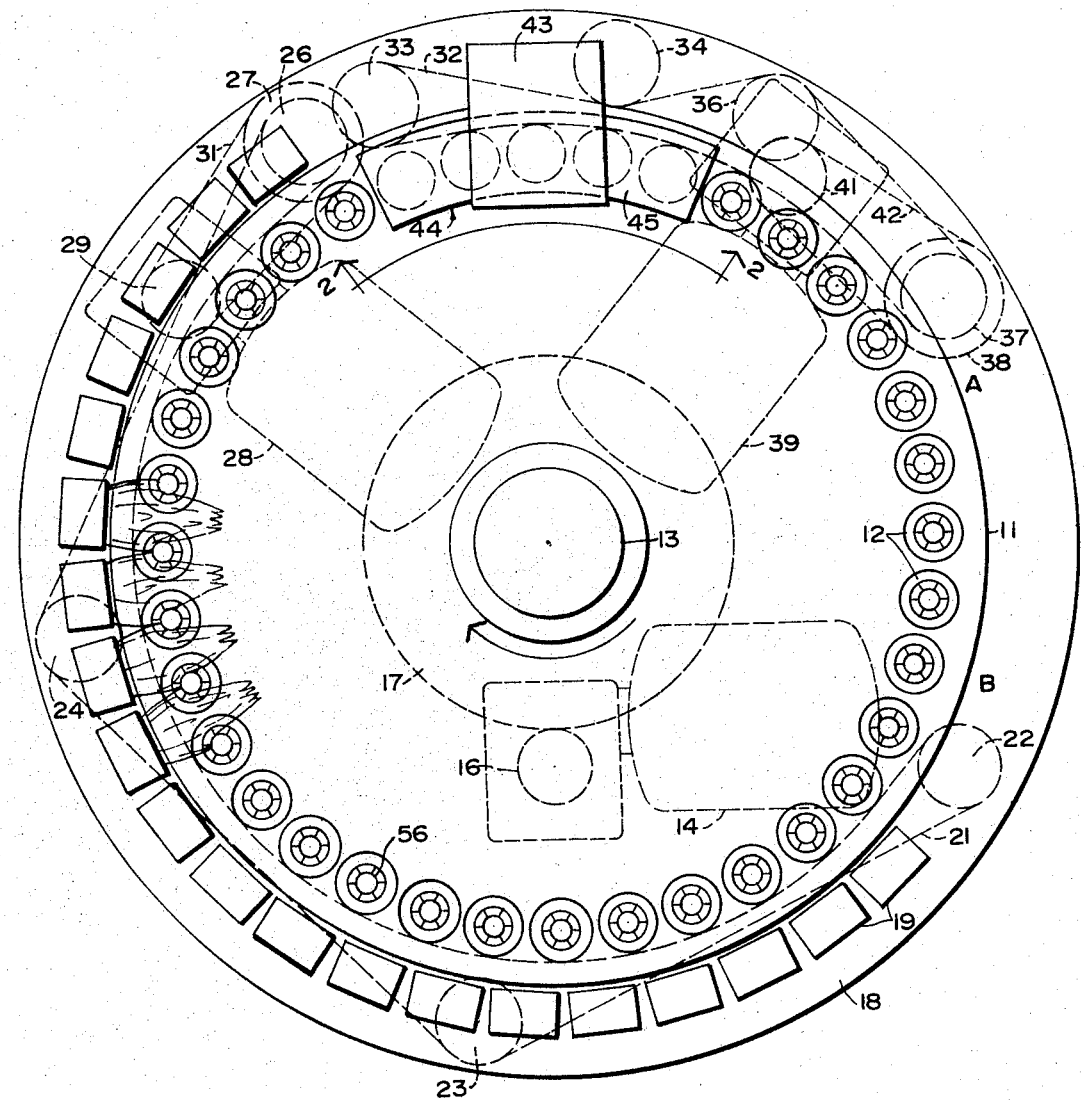
FIG. 1 is a diagrammatic representation of a plan view of an apparatus suitable for practicing the inventive method herein disclosed.
Figure 2:
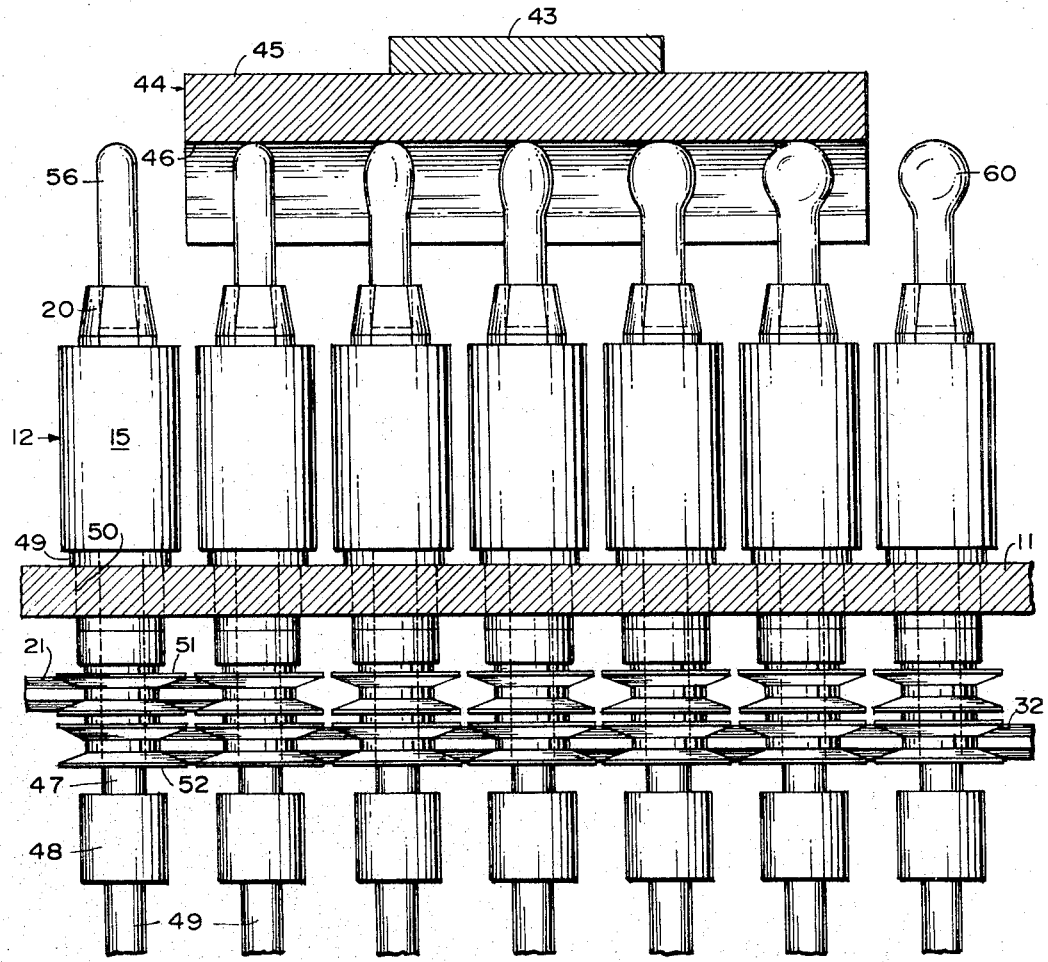
FIG. 2 is a partially cross-sectional illustration of a side elevation of the apparatus of FIG. 1 taken substantially along line 2—2 of such drawing figure.

Referring to FIGS. 1 and 2 of the drawings, there is shown a horizontally disposed turret 11 having equally spaced about the periphery thereof a plurality of chucks such as 12 each of which, as best illustrated in FIG. 2 of the drawings, is adapted for receiving and somewhat gripping the open end of a length of tubing, such as 56, having one closed end. Turret 11 is adapted to rotate about a shaft or center column 13 and is continuously rotatively driven in a clockwise direction about said column by a gear motor 14 having an output gear 16. Output gear 16 drives a cooperating gear 17 which is affixed to turret 11 in a driving relationship therewith. Gears 16 and 17 are preferably provided with teeth having a meshing relationship but, if desired, the driving relationship between said gears may be of the frictional type.

Chucks 12 are rotatably mounted on turret 11 and, as the turret rotates about its center column 13, each chuck is at times rotated about its center by one of two drive belts 21 and 32 depending on the location of the respective chuck at any point in time during the rotation of turret 11. The mounting of chucks 12 on turret 11 will be discussed in greater detail hereinafter.

A stationary annular support 18 surrounds the outer periphery of turret 11 and a series of burners such as 19 are provided on the top surface of such support and about a part of the periphery thereof. Burners 19 are disposed on support 18 so that their outlet orifices are directed towards the center of turret 11 and, when the burners are ignited and operating, as illustraed on the left-hand side of FIG. 1 of the drawings, they heat those portions of the lengths of tubing 56 adjacent the closed ends thereof, while such lengths of tubing are being rotated by chucks 12 and are being steadily carried past said burners by the rotation of turret 11. For purpose of simplification of the drawings, only those burners on the left-hand side of FIG. 1 are illustrated as being ignited or burning.

The previously mentioned drive belt 21 extends around a series of idler pulleys or rollers 22, 23 and 24, and around a driving pulley 26 which is affixed to a pulley 27 driven by a drive belt 31 looped about the output pulley 29 of a gear motor 28. Similarly, drive belt 32 extends around a pair of idler pulleys or rollers 33 and 36, and around a driving pulley 37 which is affixed to a pulley 38 driven by a drive belt 42 looped about the output pulley 41 of a gear motor 39. An idler roller 34 is provided to supply increased tension to belt 32.

There is also affixed to annular support 18 (FIG. 1) a mold support plate 43 from which is suspended, in any convenient manner, a continuous type of mold 44 comprising a mold body 45 having a bilaterally symmetric bulbar mold cavity 46 extending through said mold body, as best illustrated in FIGS. 2 and 3 of the drawings. As shown in FIGS. 1 and 3, mold 44 has a curvature corresponding to the curved path of travel of the chucks 12 carried by turret 11 and, as illustrated in FIG. 2, the heated upper portions of the lengths of tubing such as 56 carried by chucks 12 move through the mold cavity 46 provided in the mold body 44. This will be further discussed hereinafter.

Referring specifically to FIG. 2 of the drawings, each chuck such as 12 comprises a hollow body portion 15 including a tubing receiving and gripping portion 20. A hollow shaft 47 is affixed to the body portion 15 of chuck 12 and extends from such body portion 15 through a collared bearing 49 secured in a hole 50 extending through turret 11. A pair of pulleys 51 and 52 are affixed to the hollow shaft 47 so that rotation of the pulleys will cause corresponding rotation of shaft 47 within bearing 49 and a similar rotation of chuck 12. The lower end of hollow shaft 47 connects to one end of a rotary union 48, the other end of which connects to the outlet end of a flexible aeriform fluid conduit such as 49. As hereinafter pointed out, the ends of said fluid conduits not appearing in the drawings are connected to a source of aeriform fluid pressure which, at predetermined times, may be intermittently or steadily selectively and individually supplied to each such conduit.

The previously mentioned drive belt 21 is arranged to extend between the flanges of the pulleys such as 51 (FIG. 2) of the chucks 12 and, when gear motor 28 is operating, belt 21 rotationally drives each chuck 12 when the pulley 51 of the respective chuck is contacted by belt 21 during the rotation of turret 11 (FIG. 1). Similarly, drive belt 32 is arranged to extend between the flanges of the pulleys such as 52 (FIG. 2) of the chucks 12 and, when gear motor 39 is operating, belt 32 rotationally drives each chuck 12 when the pulley 52 of the respective chuck is contacted by belt 32 during the rotation of turret 11 (FIG. 1).

The apparatus illustrated in FIGS. 1 and 2 having been discussed, a brief discussion of the operation of such apparatus when being used to practice the inventive method herein disclosed will now be given.

It will first be assumed that gear motors 14, 28 and 39 are energized and, therefore, turret 11 is being rotatively driven in a clockwise direction as indicated by the arrow in FIG. 1, and that drive belts 21 and 32 are rotating each of the respective chucks 12 as such chucks are moved, by the rotation of turret 11, along those portions of the path of rotation of the turret where the chucks will be driven by the respective belts. Such portions of the path of rotation of turret 11 are readily apparent from a brief glance at FIG. 1 of the drawings.

Although, for purpose of simplification of the drawings, only those burners 19 at the left-hand side of FIG. 1 are illustrated as ignited or burning, it will be further assumed that all such burners are ignited and emitting flames above chucks 12 as such chucks pass the row of burners.

Two positions, A and B, are indicated on support 18 at the right-hand side of FIG. 1, such two positions and the space therebetween comprising a chuck loading and unloading station. The open ends of lengths of thermoplastic tubing, such as 56 (FIG. 2), each having one closed end, are individually inserted into each empty chuck in the vicinity of position B as the respective chuck approaches or arrives at such position during the rotation of turret 11. Such loading of the chucks may be performed manually or by feeding mechanisms such as are well known in the art. Each formed length of thermoplastic tubing such as 60 (FIG. 2) is removed from its respective chuck as such chuck arrives at or passes position A during rotation of turret 11. The unloading or removal of the formed lengths of tubing may be performed by hand or by take-out mechanisms, or ejection apparatus which may be incorporated into the chucks 12 may be employed for such unloading. Such take-out mechanisms or ejection apparatus are well known in the art.

As each loaded chuck 12 is carried past position B by the rotation of turret 11 and enters the region of the burners 19, belt 21 engages pulley 51 of each respective chuck and the chuck and its supported length of tubing 56 begin to rotate. The flames from burners 19 play upon the upper portion of the lengths of tubing 56, adjacent the closed ends thereof, as such lengths of tubing move along the row of burners 19. The rotation of the individual chucks 12 at such time assures substantially even heating around the peripheries of the lengths of tubing. Such heating of the lengths of tubing continues until just prior to the entrance of each respective length into the mold cavity 46 extending through mold body 45 of mold 44 (FIGS. 1, 2 and 3). Thus, by the time each length of tubing arrives at the entrance to mold cavity 46, the upper portion thereof, which is the end to be formed, is at its working or plastic temperature, that is, is sufficiently softened as to be readily reformable.

Just after the entrance of each length of tubing into mold cavity 46, belt 32 engages the pulley 51 of the respective chuck 12 supporting such length of tubing and the chuck and associated tubing begin to rotate at a relatively rapid rate of speed. Such rotation continues during the passage of each chuck through the entire length of the mold cavity 46 and for a short distance beyond the exit end of such cavity.

The above described rotation of the softened or now plastic ends of the lengths of tubing passing through the mold cavity 46 tends to somewhat expand such ends by the centrifugal force imparted thereto by such rotation. Simultaneously, with the passage of the lengths of tubing 56 through the mold cavity 46, pressurized aeriform fluid is supplied to the interior of each such length of tubing by means of the fluid conduits such as 49 connected through rotary union 48 to the hollow shaft 47 affixed to the body portion 15 of the respective chuck 12. Such aeriform fluid may be continuously supplied to the interior of each length of tubing during its passage through the mold cavity 46 or alternatively and preferably, the aeriform fluid may be selectively intermittently supplied to the tubing interiors, that is, the aeriform fluid may be supplied to the interiors of the lengths of tubing at selected intervals and/or at varying pressures during the passage of the lengths of tubing through the cavity 46 of mold body 44. As illustrated in FIG. 2 of the drawings, such pressurized aeriform fluid, along with the previously mentioned centrifugal force imparted to each length of tubing by the rotation thereof, causes progressive expansion of the softened or plastic upper closed end of each respective piece of tubing as it passes through the mold cavity, until said end of the tubing fills the enlarged portion of such cavity and the tubing is finally provided with a radially symmetric bulbar configuration corresponding to the bilaterally symmetric bulbar cross-sectional configuration of the mold cavity, as illustrated by the formed piece of tubing such as 60 shown in FIG. 2 of the drawings.

As previously mentioned, the formed pieces of tubing such as 60 (FIG. 1) are bulbar or bulb-shaped hollow vessels, envelopes or enclosures which may be employed for any suitable purpose and are especially suitable for use as enclosures in the manufacture of many types of incandescent lamps.

The brief continued rotation of the enclosures or formed pieces of tubing such as 60, following their passage through the mold cavity 46, assures the retention by each such formed enclosure of the configuration imparted thereto while passing through said mold cavity. That is, the continued centrifugal force imparted to the enclosures or envelopes by the continued rotation thereof after leaving mold 44 maintains the configuration imparted to such hollow vessels or containers until it is assured that they are cooled sufficiently to have lost their plasticity. It is also pointed out that the formed enclosures or envelopes cool somewhat while passing through mold 44 and that their brief continued rotation beyond the exit end of the mold also provides additional cooling for the formed envelopes. As previously mentioned, when the formed lengths of tubing or hollow vessels such as 60 reach or pass position A they are removed or ejected from their respective chucks such as 12 and another length of unformed tubing is loaded into the respective empty chuck.

Referring now to FIG. 4 of the drawings, there is shown a mold 55, similar to mold 44 of FIG. 3, but having no linear curvature, that is, of a straight-line type. Mold 55 comprises a mold body 57 having extending longitudinally therethrough a mold cavity 58 having a bilaterally symmetric bulbar cross-sectional configuration. Such mold may also be employed for practicing the method of the present invention and, as is believed obvious, is intended for use with an in-line or straight-line system of enclosure-forming rather than the curved-line system illustrated in FIGS. 1 and 2. In such a straight-line system a plurality of chucks such as 12 (FIGS. 1 and 2) may, for example, be carried by an endless chain around a path of travel which includes a straight-line region in the area of the location of a mold such as 55. Apparatus for practicing the herein disclosed method of tubing-forming by such a straight-line system will be readily obvious, in the light of the present disclosure, to those skilled in the art.

FIGS. 5, 6 and 7 illustrate several possible alternative bilaterally symmetric bulbar cross-sectional configurations for the mold cavities 46 or 58 extending through mold bodies 45 and 57, respectively. Other such configurations for said mold cavities are readily conceivable.

Returning briefly to FIGS. 1 and 2 of the drawings, turret 11 may, for example, be rotated at a speed of from two to three revolutions per minute. Since there are eighteen chucks 12 around the periphery of turret 11, from 76 to 108 bulbar enclosures can be formed at such rates of speed. However, it is pointed out that the speed of turret 11, and/or the diameter thereof, can be varied within practicable limits, and that the number of chucks 12 thereon can be increased or decreased as desired. Similarly, the chucks such as 12 can be arranged to support lengths of tubing of any diameter, or different size chucks may be employed and the number thereof around the periphery of a turret such as 11 can be increased or decreased accordingly as the size of the chucks are decreased or increased, respectively. Such expedients will be readily apparent to those skilled in the art.

It is further pointed out that, in practicing the method of the present invention, the lengths of tubing such as 56 need not necessarily be supported in a vertical position, that is, with their closed ends in the upper position, but such lengths of tubing may be oppositely supported, that is, with their closed ends downwardly disposed. Further, the lengths of tubing may be horizontally supported or supported at any other one of the 360 degrees of a circle. Of course, in such event, the forming mold such as 44 or 55, and the associated apparatus, must be correspondingly arranged.

In the actual practice of the method of the present invention several parameters must be taken into consideration. These are, for example, the wall thickness of the lengths of tubing, their diameters, and the composition from which the tubing was originally formed, all of which affect the length of time required to heat that portion of the tubing, to be reformed, to its working or plastic temperature. Such parameters thereafter affect the number of burners required for said heating purposes and/or the rate of speed at which the lengths of tubing can be moved past the bank of burners. The length of the forming mold is also dependent on said rate of speed or, conversely, such rate of speed depends somewhat on the length of the mold employed. However, all such parameters and variables can readily be determined and the optimum control thereof attained by a minimum amount of experimentation by those skilled in the art.

Although there is herein shown and discussed in any detail only one form of apparatus which may be employed in practicing the inventive method disclosed, it is not intended that the practice of such new and novel method be confined only to the use of such apparatus and it will be understood that the invention is not limited, necessarily, to the specific details as are herein specifically illustrated and described, but it will be apparent that such details are subject to various modifications which become apparent to one skilled in the art without departing from the spirit of the invention. It will be further understood, therefore, that it is intended and desired to include within the scope of the invention, as set forth in the appended claims, such modifications and changes as may be necessary to adapt it to varying conditions and uses.

What is claimed is:

1. A method of forming a radially symmetric bulb-shaped envelope from a piece of thermoplastic tubing closed at one end thereof, such method comprising, evenly heating the portion of said piece of tubing adjacent the closed end thereof to its plastic temperature; rotating said tubing about its longitudinal axis and moving the tubing through a longitudinal cavity extending through a mold body, such cavity including a channel portion through which the open end of said piece of tubing extends exteriorly of the mold, the cavity also having a bilaterally symmetric cross-sectional configuration corresponding to the radially symmetric bulb-shaped configuration for said envelope; and, during at least part of the period of movement through said cavity, supplying, at least intermittently, pressurized aeriform fluid through the open end of said piece of tubing to the interior thereof to enlarge the closed end of such piece of tubing so that it conforms to the bulbar portion of the cavity.

2. The method in accordance with claim 1 in which said piece of tubing is a piece of glass tubing.

3. A method of forming a plurality of radially symmetric bulb-shaped containers from a plurality of pieces of thermoplastic tubing each closed at one end thereof, such method comprising, evenly heating at least the parts of said pieces of tubing adjacent the closed ends thereof to their plastic temperature, rotating said pieces of tubing about their longitudinal axes and sequentially and steadily moving the closed ends thereof through a longitudinal cavity extending through a mold body along a preselected axis, such cavity including a channel portion extending parallel with said preselected axis and leading to the exterior of said mold body for passage of the open ends of said pieces of tubing, the cavity also having a configuration such that any section of the cavity taken at right angles to the longitudinal axis thereof corresponds to the radially symmetric bulb-shaped configuration desired for the containers; and supplying, at least intermittently, pressurized aeriform fluid through the open ends of said pieces of tubing to the interiors thereof during at least a part of the period of movement of each respective piece through said cavity to enlarge the closed ends of the pieces of tubing so that they conform to the shape of the bulbar portion of the cavity.

4. The method in accordance with claim 3 in which said pieces of thermoplastic tubing are pieces of glass tubing.

5. A method of forming incandescent lamp enclosures from lengths of glass tubing each having a closed end, such method comprising, evenly heating at least the closed ends of said lengths of tubing to the temperature of the working range for the glass; moving the heated ends of said lengths of tubing in sequential order through a mold cavity extending lengthwise through a mold, such cavity having a bilaterally symmetric transverse shape including a bulbar and a neck portion joining each other, the free end of such neck portion extending through one of the sides of the mold along the entire length thereof and having a transverse dimension corresponding to the diameter of said tubing; and inflating the heated ends of said lengths of tubing by supplying, at least intermittently, pressurized aeriform fluid to the interiors thereof through the open ends of such lengths of tubing extending through said free end of said mold cavity while simultaneously rotating said lengths about their longitudinal axes, whereby the heated ends of such lengths are provided with a radially symmetric bulbar shape corresponding to the bilaterally symmetric shape of said bulbar portion of said cavity; and cooling said inflated ends, following the inflation thereof, to seal in said bulbar shape imparted thereto.

6. A method of forming a bulbar envelope from a cylindrical piece of glass tubing having one closed end, such method comprising, evenly heating the closed end of said piece of tubing, supporting said piece of tubing by its open end while simultaneously rotating the piece of tubing about its longitudinal axis and moving the heated end thereof through the bulbar shaped longitudinal mold cavity, and during the passage of said heated end of said piece of tubing through said mold cavity, supplying pressurized aeriform fluid to the interior of such tubing to inflate such heated end to said bulbar shape.

7. The method in accordance with claim 6 in which said pressurized aeriform fluid is only periodically supplied to the interior of the tubing during its passage through said mold cavity.

8. The method of reforming the closed end portion of a length of thermoplastic tubing having one closed end into a bulbar configuration, which comprises, evenly heating to its plastic temperature that portion of the tubing to be reformed; rotatively passing such heated tubing through a longitudinal mold cavity extending through a mold body, such cavity being bilaterally symmetric cross-sectionally and including a bulbar portion corresponding to the bulbar configuration desired for said closed end portion opening to the exterior of said mold body of the tubing and a channel portion for the passage of the open end portion of the tubing; and, blowing, at least intermittently, aeriform fluid into the interior of the tubing during its passage through said mold cavity.

9. The method in which a plurality of lengths of thermoplastic tubing are continuously sequentially reformed in accordance with the steps set forth in claim 8.

10. A mold for reshaping lengths of thermoplastic tubing, such mold comprising, a mold body provided with a mold cavity passing therethrough from one side of the mold body to another, such mold cavity including a bulbar portion for receiving sealed ends of lengths of thermoplastic tubing to be reshaped and a channel portion through which the open ends of such lengths of tubing may extend exteriorly of the mold, and said mold cavity having a configuration such that any section of the cavity taken at right angles to the axial line of the direction of passage of the cavity through said mold body has a bilaterally symmetric configuration corresponding to any other such section of the cavity.

11. A mold for reshaping pieces of thermoplastic tubing, such mold comprising, a mold body having a mold cavity extending therethrough along a preselected axis, such mold cavity including a channel portion extending parallel with said axis and leading to the exterior of the mold body, and said mold cavity having a cross-sectional configuration such that a heated piece of thermoplastic tubing, rotated about its longitudinal axis and moved through such cavity with such axis normal to said axis of the cavity while simultaneously being inflated, makes only line contact with the sides of the cavity tangential to the finally inflated tubing.

References Cited

UNITED STATES PATENTS

| | | | |
|---|---|---|---|
| 1,859,011 | 5/1932 | Wales | 65—110 |
| 2,059,474 | 11/1935 | Meyer | 65—109 |
| 2,103,585 | 12/1937 | Kimble et al. | 65—110 X |

DONALL H. SYLVESTER, *Primary Examiner.*

A. D. KELLOGG, *Assistant Examiner.*

UNITED STATES PATENT OFFICE
CERTIFICATE OF CORRECTION

Patent No. 3,340,034                                September 5, 1967

Elmer L. Anderson

It is certified that error appears in the above identified patent and that said Letters Patent are hereby corrected as shown below:

Column 7, lines 40 and 41, cancel "opening to the exterior of said mold body of the tubing and a channel portion" and insert -- of the tubing and a channel portion opening to the exterior of said mold body --.

Signed and sealed this 9th day of December 1969.

(SEAL)
Attest:

Edward M. Fletcher, Jr.                      WILLIAM E. SCHUYLER, JR.
Attesting Officer                                   Commissioner of Patents